United States Patent Office 3,354,144
Patented Nov. 21, 1967

3,354,144
DICYANOMETHYLENEIMINO COMPOUNDS
AND THE PREPARATION THEREOF
Engelbert Ciganek, Chadds Ford, Pa., assignor to E. I. du Pont de Nemours and Company, Wilmington, Del., a corporation of Delaware
No Drawing. Filed Jan. 7, 1964, Ser. No. 336,139
9 Claims. (Cl. 260—239)

ABSTRACT OF THE DISCLOSURE

Dicyanodiazomethane prepared by the lead tetraacetate oxidation of carbonyl cyanide hydrazone and 1,1-dicyano-4,4-diaryl-2,3-diazabutadienes prepared by the reaction of a diaryl ketone triphenylphosphazine with carbonyl cyanide are claimed. 1,1-dicyano-4,4-diaryl-2,3-diazabutadienes are converted into carbonyl cyanide hydrazone when reacted with a diaryl ketone hydrazone. Dicyanodiazomethane is useful as an explosive.

---

This invention relates to new dicyanomethyleneimino compounds and their preparation.

Description of the invention

The new compounds have the formula $$(NC)_2C=N-Y$$

in which Y is nitrogen (N) or diarylmethyleneimino

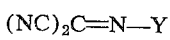

R and $R_1$ in the diarylmethyleneimino group being separate or conjoined hydrocarbon or halohydrocarbon aromatic groups. The preferred compounds are dicyanodiazomethane, $$(NC)_2C=N_2$$

and 1,1-dicyano-4,4-diaryl-2,3-diazabutadienes,

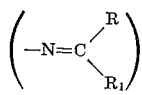

in which R and $R_1$ are hydrocarbon aromatic groups having from 6 to 12 carbon atoms each when separate and a total of 9 to 13 carbon atoms when joined.

The term aromatic, as it pertains to groups R and $R_1$, refers to the classical or benzenoid concept of six-membered carbocyclic rings each having a symmetrical sextet of $\pi$ electrons which may in part be shared with an adjacent sextet or sextets.

Dicyanodiazomethane is prepared from carbonyl cyanide hydrazone by oxidation with lead tetraacetate, $$(NC)_2C=N-NH_2+Pb(OCOCH_3)_4 \rightarrow$$
$$(NC)_2C=N_2+Pb(OCOCH_3)_2+2CH_3COOH$$

The oxidation reaction is carried out by mixing the reactants in a hydrocarbon carbonitrile, preferably acetonitrile, as a reaction medium under anhydrous conditions and at −25 to +60° C., preferably 0–40° C. Any stoichiometric excess of lead tetraacetate may be used. However, a molar ratio of 1 to 1.5 moles of lead tetraacetate per mole of carbonyl cyanide hydrazone is preferred. Although the reaction is usually carried out at atmospheric pressure, the pressure is not a critical factor and may be below or above atmospheric pressure. Likewise, time is not a critical factor and can be prolonged without harm from periods of less than one hour to many hours. The reaction, however, is generally complete within a few hours, less time being required at higher temperatures within the operable range. The solid product is isolated and purified by ordinary methods, e.g., by evaporation of the reaction medium and recrystallization of the residue from a suitable solvent.

Carbonyl cyanide hydrazone is conveniently prepared by reaction of a diaryl ketone hydrazone with a 1,1-dicyano-4,4-diaryl-2,3-diazabutadiene,

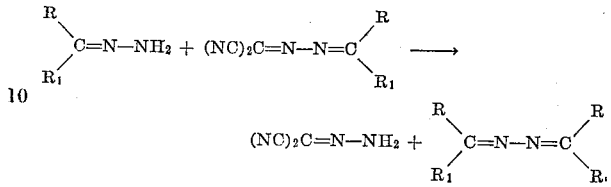

The R and $R_1$ aromatic groups in the above formulas are as previously defined. The 1,1-dicyano-4,4-diaryl-2,3-diazabutadienes are mixed (unsymmetrical) azines of carbonyl cyanide and diaryl ketones. The reaction is carried out by mixing the hydrazone and the unsymmetrical azine in a solvent at a temperature in the range of about 0° C. to about 100° C., ordinarily at room temperature, and atmospheric pressure. The pressure is not critical, however, and can be below or above atmospheric pressure. Any solvent that is unreactive toward hydrazones or azines (i.e., non-carbonylic and non-carboxylic) may be employed. Ethers such as tetrahydrofuran are preferred. A stoichiometric excess of the diaryl ketone hydrazone is not necessary but is usually employed in order to drive the exchange reaction to a practical yield of carbonyl cyanide hydrazone. Molar ratios of diaryl ketone hydrazone to 1,1-dicyano-4,4-diaryl-2,3-diazabutadiene in the range of about 1.0 to about 5.0 are practical, and ratios in the range of about 1.2 to about 2.0 are preferred. The time of reaction is not critical and can vary from less than one hour to many hours, e.g., from about 2 to 60 hours in usual practice. Shorter reaction times are more practical when higher reaction temperatures are used. The carbonyl cyanide hydrazone product is isolated at room temperature or below by concentrating the reaction mixture to dryness under vacuum. The product is purified by usual methods such as recrystallization, chromatographic separation or sublimation, the latter being especially suitable.

1,1-dicyano-4,4-diaryl-2,3-diazabutadienes are prepared by reaction of a diaryl ketone triphenylphosphazine with carbonyl cyanide,

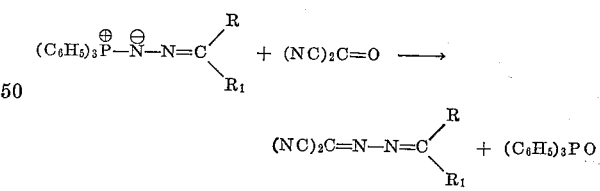

The R and $R_1$ aromatic groups in the above formulas correspond to those previously defined. In this preparation, the triphenylphosphazine and carbonyl cyanide are mixed in a suitable non-hydroxylic medium. The reaction takes place readily, usually being complete within about an hour at room temperature; and the products, after being concentrated by evaporation of the solvent medium, are isolated by any convenient method. Chromatography is especially suitable. Although the process is usually conducted at room temperature and atmospheric pressure, temperatures in the range of about 0 to about 100° C., and pressures below or above atmospheric pressure can be used. Suitable solvent media are hydrocarbons, halohydrocarbons and ethers or mixtures of such solvents.

The following examples further illustrate the preparation and properties of the new compounds of this invention.

Example 1.—Dicyanodiazomethane

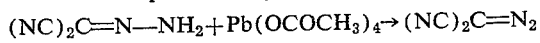

A sample of 5.15 g. (0.015 g. mole) of lead tetraacetate was kept under high vacuum at room temperature for 30 minutes to ensure absence of acetic acid. Anhydrous acetonitrile (60 ml.) was then added, with exclusion of moisture, and the mixture was stirred at room temperature for 5 minutes and then cooled with an ice bath. A solution of 1.23 g. (0.0131 g. mole) of carbonyl cyanide hydrazone in 20 ml. of acetonitrile was added with stirring over a period of 10 minutes, after which the mixture was stirred for two hours with the ice bath removed. Water (2 ml.) was added, stirring was continued for 15 minutes, and the precipitate of lead diacetate was removed by filtration. The filtrate and two washings (each of 5 ml. of acetonitrile) were concentrated to dryness at room temperature under vacuum in a rotary evaporator. The residual yellow solid was kept under 0.1 mm. pressure at room temperature for 30 minutes, and then was stirred with 100 ml. of ether for 5 minutes at atmospheric pressure. The ethereal mixture was filtered and the filtrate was concentrated to dryness, leaving 1.16 g. of essentially pure dicyanodiazomethane. An analytical sample, purified by recrystallization at low temperature from ether, melted at ca. 75° C. with gas evolution.

Analysis for $C_3N_4$.—Calc'd: C, 39.1; N, 60.9; Mol. wt. 92.0. Found: C, 39.6; N, 61.6; Mol. wt. 92.0. The infrared spectrum (in KBr) showed characteristic bands at 2225, 2140, 1240, and 1215 cm.$^{-1}$. The ultraviolet spectrum (in acetonitrile) showed $\lambda_{max.}$ at 241 m$\mu$ $$(\epsilon=12,400)$$

313 m$\mu$ ($\epsilon=107$), and 370 m$\mu$ (shoulder, $\epsilon=50$).

Example 2.—Carbonyl cyanide hydrazone $$(NC)_2C=N-N=C(C_6H_5)_2 + (C_6H_5)_2C=N-NH_2 \rightarrow$$
$$(NC)_2C=N-NH_2 + (C_6H_5)_2C=N-N=C(C_6H_5)_2$$

A solution of 3.0 g. (0.0116 g. mole) of 1,1-dicyano-4,4-diphenyl-2,3-diazabutadiene and 3.0 g. (0.0153 g. mole) of benzophenone hydrazone in 40 ml. of tetrahydrofuran was kept at room temperature for 12 hours. Removal of the solvent at room temperature under vacuum in a rotary evaporator gave 6.0 g. of a yellow solid. The solid was stirred with 60 ml. of benzene at room temperature, and the insoluble material was chromatographed on chromatographic grade magnesium fluorosilicate. Elution with a 1:1 mixture of benzene:methylene chloride yielded benzophenone azine as a first fraction; and subsequent elution with tetrahydrofuran yielded 0.72 g. of a brown solid which gave off-white crystals of carbonyl cyanide hydrazone after sublimation at 0.1 mm. and 80° C. The sublimed product melted with decomposition and darkening at ca. 115° C. (hot stage), and slowly darkened in storage at room temperature.

Analysis for $C_3H_2N_4$.—Calc'd: C, 38.3; H, 2.14; N, 59.6; Mol. wt. 94.1. Found: C, 38.7; H, 2.35; N, 59.1; Mol. wt. 93.0. Spectrographic analyses were as follows:

IR spectrum ("Nujol" mull and tetrahydrofuran solution): characteristic bands at 3400, 3270, 3170 (for —$NH_2$), 2225 (doublet, for —C≡N), 1650 (for —$NH_2$), 1500, 1460 (for —N=C—), 1270, 1190, 1160 and 740 cm.$^{-1}$.

UV spectrum (acetonitrile solution): $\lambda_{max.}$ at 283 m$\mu$ ($\epsilon=13,800$).

NMR spectrum (acetone-D solution); single peak at 0.25$\lambda$.

Mass spectrum (115° C. inlet temperature): m/e at 94 (parent), 66, 65, 64 (malononitrile) and 28 (nitrogen).

Example 3.—1,1-dicyano-4,4-diphenyl-2,3-diazabutadiene

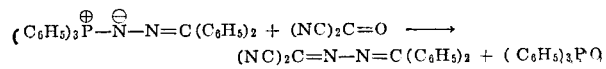

To a suspension of 3.0 g. (0.0066 g. mole) of benzophenone triphenylphosphazine [Staudinger & Meyer, Helv. Chim. Acta, 2, 619 (1919)] in 30 ml. of chloroform was added at room temperature, with stirring and under nitrogen, a solution of 1.02 g. (0.0127 g. mole) of carbonyl cyanide in 10 ml. of tetrahydrofuran. The mixture turned orange and became homogeneous in a few minutes. After 30 minutes at room temperature the solvent was removed under reduced pressure, and the residual oil (3.42 g.) was chromatographed on magnesium fluorosilicate. Elution with 1:1 n-hexane:benzene yielded 1.20 g. of 1,1-dicyano-4,4-diphenyl-2,3-diazabutadiene as a first fraction, and further elution with 7:3 methylene chloride:tetrahydrofuran gave 1.37 of triphenylphosphine oxide as a second fraction. The 1,1-dicyano-4,4-diphenyl-2,3-diazabutadiene melted at 95–96.5° C.

Analysis for $C_{16}H_{10}N_4$.—Calc'd: C, 74.4; H, 3.91; N, 21.7; Mol. wt. 258.3. Found: C, 74.3; H, 4.04; N, 21.7; Mol. wt. 269, 280. The infrared spectrum showed characteristic bands at 2230, 1600, 1590, 1500, 1490, 1540 cm.$^{-1}$, among others. The ultraviolet spectrum (in cyclohexane) showed $\lambda_{max.}$ at 230 m$\mu$ ($\epsilon=12,900$), 275 m$\mu$ (shoulder, $\epsilon=9700$) and 335 m$\mu$ ($\epsilon=13,200$).

Example 4.—1-dicyanomethylene - 2 - (9-fluorenylidene) hydrazine

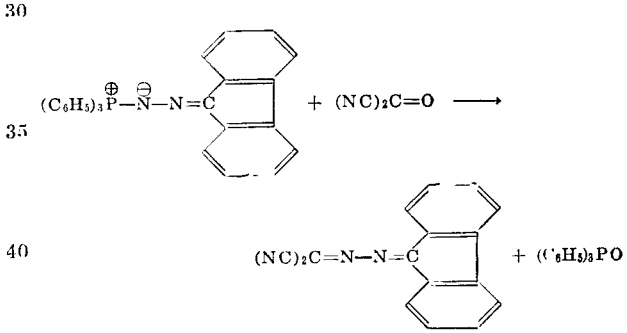

A solution of 1.57 g. (0.0196 g. mole) of carbonyl cyanide in 15 ml. of tetrahydrofuran was added to a cooled (—80° C.) suspension of 7.11 g. (0.0157 g. mole) of fluorenone triphenylphosphazine [Staudinger & Meyer, Helv. Chim. Acta, 2, 619 (1919)] in 25 mol. of tetrahydrofuran. The mixture was stirred while it warmed to room temperature (ca. 1 hour), and for 30 minutes more. The dark purple homogeneous mixture was concentrated to dryness and the residue (8.36 g.) was chromatographed on magnesium fluorosilicate. Crude 1-dicyanomethylene - 2 - (9-fluorenylidene)hydrazine eluted in 3.44 g. yield with 700 ml. of 1:1 benzene:methylene chloride. The product was purified by recrystallization in benzene; red needles, M.P. 171.5–172° C.

Analysis for $C_{16}H_8N_4$.—Calc'd: C, 75.0; H, 3.15; N, 21.9; Mol. wt. 256.3. Found: C, 75.2; H, 3.61; N, 21.5; Mol. wt. 271, 262. The infrared spectrum (in KBr) showed characteristic bands at 2230 (for —CN), 1610, 1590, 1490, 1470 and 1450 cm.$^{-1}$. The ultraviolet spectrum (in $CH_3CN$) showed $\lambda_{max.}$ at 240 m$\mu$ ($\epsilon=28,700$), 270 m$\mu$ ($\epsilon=31,800$), 358 m$\mu$ ($\epsilon=15,800$), 400 m$\mu$ $$(\epsilon=5300)$$

and 500 m$\mu$ ($\epsilon=230$).

Examples of additional 1,1-dicyano-4,4-diaryl-2,3-diazabutadienes obtainable by the process of this invention are shown in the following table, wherein R and $R_1$ represent the aromatic groups.

Table

| R | $R_1$ |
|---|---|
| Phenyl | o-Tolyl |
| p-Tolyl | p-Tolyl |
| Phenyl | p-Diphenyl |
| p-Diphenyl | p-Diphenyl |
| p-Syclohexylphenyl | p-(n-Propyl)phenyl |
| p-Chlorophenyl | Phenyl |
| p-Bromophenyl | p-Bromophenyl |
| o-Fluorophenyl | Phenyl |
| α-Naphthyl | α-Naphthyl |
| β-Naphthyl | β-Naphthyl |
| R—$R_1$ joined | |
| 1-indenylidene | |

The 1,1-dicyano-4,4-diaryl-2,3-diazobutadienes are useful as intermediates in the preparation of dicyanodiazomethane. Dicyanodiazomethane is useful as an ingredient in explosives. In tests for rating of propellants, dicyanodiazomethane decomposed violently after 33 seconds at 70–71° C., it flashed instantaneously when dropped on a hot bar at 250° C., it detonated at 8200 static volts (compounds unstable below 10,000 static volts are considered unsafe for ordinary handling by man), and when exploded on a lead plate it showed a power score of 2 in a scale of 0–6 where 0 denotes maximum power and 6 denotes barely detectable power.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Dicyanodiazomethane.
2. A compound of the formula $$(NC)_2C=N-Y$$

wherein Y is a diarylmethyleneimino radical of the formula

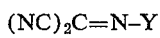

where R and $R_1$ are members selected from the group consisting of separate and conjoined hydrocarbon and halohydrocarbon aromatic radicals.

3. A compound of the formula

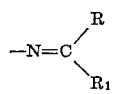

wherein R and $R_1$ are separate hydrocarbon aryl radicals of 6 to 12 carbon atoms each.

4. 1,1-dicyano-4,4-diphenyl-2,3-diazobutadiene.
5. A compound of the formula

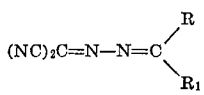

wherein R—$R_1$ taken together is a divalent hydrocarbon arylene radical of 9 to 13 carbon atoms.

6. 1-dicyanomethylene-2-(9-fluorenylidene)hydrazine.
7. Process for the preparation of dicyanodiazomethane which comprises (1) contacting and reacting a diaryl ketone triphenylphosphazine of the formula

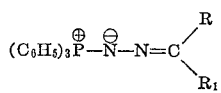

wherein R and $R_1$ are members selected from the group consisting of separate and conjoined hydrocarbon and halohydrocarbon aromatic radicals, with carbonyl cyanide in a non-hydroxylic reaction medium at a temperature in the range from 0° C. to 100° C., thereby preparing a compound of the formula

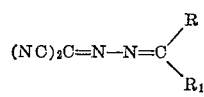

wherein R and $R_1$ are as defined above; (2) contacting and reacting said compound with a stoichiometric excess of a diaryl ketone hydrazone of the formula

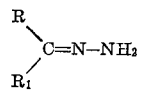

wherein R and $R_1$ are as defined above, in an unreactive solvent at a temperature in the range from 0° C. to 100° C., thereby preparing carbonyl cyanide hydrazone; and (3) oxidizing said carbonyl cyanide hydrazone with a stoichiometric excess of lead tetraacetate in a hydrocarbon carbonitrile reaction medium under anhydrous conditions at a temperature in the range from −25° C. to +60° C., thereby preparing dicyanodiazomethane.

8. Process for the preparation of a compound of the formula

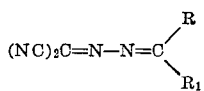

wherein R and $R_1$ are members selected from the group consisting of separate and conjoined hydracarbon and halohydrocarbon aromatic radicals, which comprises contacting and reacting a diaryl ketone triphenylphosphazine of the formula

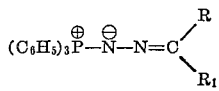

wherein R and $R_1$ are as defined above, with carbonyl cyanide in a non-hydroxylic reaction medium at a temperature in the range from 0° C. to 100° C.

9. Process for the preparation of dicyanodiazomethane which comprises oxidizing carbonyl cyanide hydrazone with a stoichiometric excess of lead tetraacetate in a hydrocarbon carbonitrile reaction medium under anhydrous conditions at a temperature in the range from −25° C. to +60° C.

References Cited

UNITED STATES PATENTS 3,242,166   3/1966   Krespan et al. _____ 260—239

OTHER REFERENCES

Bestmann et al., Berichte, vol. 94 (1961), pp. 2479–80.

NICHOLAS S. RIZZO, *Primary Examiner.*

R. GALLAGHER, *Assistant Examiner.*

UNITED STATES PATENT OFFICE
CERTIFICATE OF CORRECTION

Patent No. 3,354,144                      November 21, 1967

Engelbert Ciganek

It is certified that error appears in the above identified patent and that said Letters Patent are hereby corrected as shown below:

Column 3, line 22, for "etheral" read -- ethereal --; column 4, line 14, after "1.37" insert -- g. --; line 51, for "mol." read -- ml. --; column 5, line 7, for "p-Syclohexylphenyl" read -- p-Cyclohexylphenyl --; lines 17 and 58, for "diazobutadienes", each occurrence, read -- diazabutadienes --; column 6, line 40, for "hydracarbon" read -- hydrocarbon --.

Signed and sealed this 24th day of June 1969.

(SEAL)
Attest:

Edward M. Fletcher, Jr.                    WILLIAM E. SCHUYLER, JR.
Attesting Officer                            Commissioner of Patents